United States Patent [19]

Bodenhausen et al.

[11] Patent Number: 4,855,593

[45] Date of Patent: Aug. 8, 1989

[54] METHOD FOR RECORDING ICR MASS SPECTRA AND ICR MASS SPECTROMETER DESIGNED FOR CARRYING OUT THE SAID METHOD

[75] Inventors: Geoffrey Bodenhausen, Pully; Peter E. Pfändler, Lausanne; Jacques Rapin, Lausanne; Tino Gaumann, Lausanne; Raymond Houriet, Lausanne, all of Switzerland

[73] Assignee: Spectrospin, AG, Zurich, Switzerland

[21] Appl. No.: 198,975

[22] Filed: May 26, 1988

[30] Foreign Application Priority Data

Jun. 6, 1987 [DE] Fed. Rep. of Germany ....... 3719018

[51] Int. Cl.[4] .............................................. B01D 59/44

[52] U.S. Cl. ..................................... 250/282; 250/291

[58] Field of Search ....................... 250/282, 290, 291; 364/498

[56] References Cited

U.S. PATENT DOCUMENTS 3,475,605 10/1969 Llewellyn .......................... 250/291
3,742,212 6/1973 McIver ............................... 250/291
3,937,955 2/1976 Comisarow et al. ............... 250/291
4,682,027 7/1987 Wells .................................. 250/291
4,686,365 8/1987 Meek et al. ......................... 250/291
4,761,545 8/1988 Marshall et al. .................... 250/291

*Primary Examiner*—Bruce C. Anderson
*Attorney, Agent, or Firm*—Helfgott & Karas

[57] ABSTRACT

Ion cyclotron resonance is an important method used in mass spectroscopy. Examinations for determining the reactions between substances by means of the two-dimensional ICR method are carried out using the following measuring sequence:

$$P_1-t_1-P_2-T_m-P_3-t_2,$$

wherein $P_1$, $P_2$ and $P_3$ are rf pulses, with the rf pulses $P_1$ and $P_2$ having the same frequency, $t_1$ and $T_m$ are time intervals between the pulses and $t_2$ is the observation time following the last pulse. This measuring sequence is repeated several times while varying $t_1$. In this manner, a plurality of induction signals recorded during the time $t_2$ is obtained, from which then a two-dimensional spectrum is derived by transformation from the time domain into the frequency domain. The transformation from the time domain to the frequency domain can be effected by two-dimensional Fourier transformation, or with the aid of the method of maximum entropy.

7 Claims, 3 Drawing Sheets

Figure 1A:
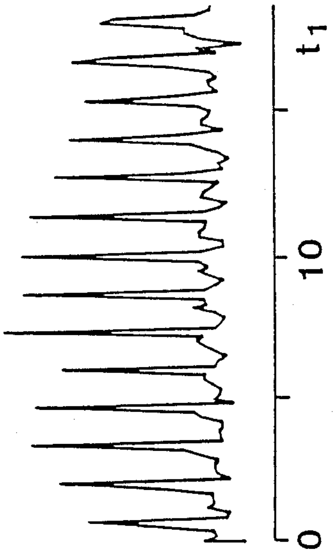

METHOD FOR RECORDING ICR MASS SPECTRA AND ICR MASS SPECTROMETER DESIGNED FOR CARRYING OUT THE SAID METHOD

The present invention relates to a method for recording ICR mass spectra wherein the ions of a substance to be examined, which are trapped in the measuring cell of an ICR mass spectrometer, are excited to coherent oscillation by means of an rf pulse applied to the measuring cell, whereafter the rf signals induced by the oscillations of the excited ions are received for a predetermined measuring period, recorded and transformed into frequency-dependent signals.

Ion cyclotron resonance, which has been described for example by A. G. Marshall in Acc. Chem. Res. 18 (1985) 316 is a method excellently suited for mass spectroscopy due to its adaptability, sensitivity and high resolution. It permits ions of different types contained in a gas sample to be excited simultaneously by a correspondingly broad pulse so that a frequency mixture prevails in the rf signal induced by the excited ions after the end of the pulse. The components contained in the induction signal can then be resolved according to frequency and intensity by Fourier transformation.

However, ICR mass spectroscopy does not only permit to carry out analyses of substances or substance mixtures; by means of the the double-resonance method, which has been described for example by J. D. Baldeschwieler and E. W. Randall in Acc. Chem. Res. 63 (1963) 81, it also permits to observe dynamic processes, for example the products of ion/molecule collisions and of unimolecular fragmentations. In the case of this double-resonance method, which is also described as MS/MS experiment, one initially eliminates, by irradiating corresponding cyclotron resonance frequencies, all ions of the substance to be examined which are trapped in the measuring cell of an ICR mass spectrometer, except for the one type of ions which is to be further examined. If necessary, one then introduces a collision gas into the measuring cell. Thereafter, the selected ion type is excited to such a degree that collisions occur between different ions and between ions and the molecules of the collision gas and that secondary fragments are generated by impact dissociation. Finally, the secondary ions obtained are analyzed by means of the usual ICR measuring cycle. If the original mass spectrum contains a number N of lines, a number N of such experiments will be required for complete analysis. Each line of the original spectrum gives rise to a number of new spectral lines so that a two-dimensional field of spectral lines is obtained when the original spectral lines are plotted along one coordinate direction and the secondary spectral lines associated with the said first spectral lines are plotted along a second coordinate direction. Even if such an MS/MS experiment is carried out automatically, it takes a very long time and requires a considerable apparatus input. In addition, automatic operation will fail when the spectra are very complex and exhibit overlapping lines or weak lines extending close to the detection line.

Now, it is the object of the present invention to provide a method for recording ICR mass spectra which although enabling the same examinations to be carried out as double-resonance experiments, requires considerably shorter measuring times and less apparatus input and which in addition is generally applicable also under complex conditions.

According to the present invention, this object is achieved by the steps of applying a first rf pulse $P_1$ for exciting the ions, irradiating upon the excited ions, after a predetermined first period $t_1$, a second rf pulse $P_2$ containing the same frequency as the first rf pulse $P_1$, applying, after a pre-determined mixing period $T_m$ following the second rf pulse $t_2$, a third rf pulse $P_3$ which again effects coherent excitation of the ions contained in the measuring cell, receiving and recording during the pre-determined measuring period $t_2$ the rf signals induced by the oscillations excited by the third rf pulse $P_3$, repeating several times the measuring sequence described before and comprising the steps of exciting the ions by means of three rf pulses $P_1$, $P_2$, $P_3$ following each other in time and recording the induced time-dependent rf signal, while varying the pre-determined period $t_1$, and transforming finally the sets of rf signals dependent on the measuring time $t_2$, which are now dependent on the variation of the period $t_1$, into two-dimensional frequency-dependent signals, by eliminating the dependence on $t_2$ and $t_1$.

Accordingly, the method according to the invention is comparable, in certain respects, to the method of two-dimensional exchange spectroscopy (NOESY) known from the field of nuclear magnetic resonance and used there for investigate dynamic processes, such as chemical reactions, isomerization, and the like (compare for example B. H. Meier and R. R. Ernst in J. Am. Chem. Soc. 101 (1979) 6441, and J. Jeener et al in J. Chem. Phys. 71 (1979) 4546). In spite of this fact it did not by any means suggest itself to use an analogous method in ICR spectroscopy because there exist fundamental differences between the transversal magnetization of the spins observed in NMR, and the coherent resonance of the ions excited in ICR spectroscopy. In addition, the resonance frequencies encountered in NMR spectroscopy are very close to each other so that they differ from each other by a few percent at the most, whereas in the case of cyclotron ion resonance the resonance frequencies will have a relation to each other of up to approximately 1:50, due to important variations in the charge-to-mass ratio. In the case of an ICR mass spectrometer, the measuring cell of which is exposed to a static magnetic field of 3T, the resonance frequencies of the substances under examination may vary, for example, between 50 kHz and 2.6 MHz. However, according to a further improvement of the method according to the invention, the difficulties resulting from this fact may be overcome either by giving the third rf pulse $P_3$ a different carrier frequency than the first two rf pulses $P_1$ and $P_2$, or by the fact that the rf pulses used are broad-band pulses with a carrier frequency varying within a pre-determined range. Such broad-band pulses are also described as "chirp pulses" (M. B. Comisarow and A. G. Marshall in Chem. Phys. Lett. 26 (1974) 489).

Accordingly, the method according to the invention may be described by the following sequence:

$$P_1—t_1—P_2—T_m—P_3—t_2,$$

wherein:

$P_1$ = first rf excitation pulse
$P_2$ = second rf excitation pulse
$P_3$ = third rf excitation pulse
$t_1$ = variable preparation time (time parameter of the first dimension)

$t_2$=observation time for the interferogram (time parameter of the second dimension)

$T_m$=reaction time.

As mentioned before, the second rf pulse $P_2$ contains the same frequency as the first rf pulse $P_1$. If at the end of the variable preparation time, the ions exhibit a phase opposite to the phase of the second rf pulse $P_2$, the second rf pulse $P_2$ will cancel out in part the effect of the first rf pulse $P_1$. The effect of the second pulse is, therefore, dependent on the instantaneous phase of the movement of the individual ions at the end of the first period of time $P_1$, which is therefore described as preparation time. Accordingly, the number of incoherent ions available at the end of the second rf pulse $P_2$ and thus, at the beginning of the reaction time $T_m$ is a function of the preparation time $t_1$. The events occurring within the reaction time $T_m$, which depend on the number of ions excited are, therefore, influenced accordingly. Consequently, there exists a dependence between the induction signal recorded after the repeated excitation of the ions by the third rf pulse $P_3$ during the second period of time $t_2$, and the duration of the preparation time $t_1$. Now, when the preparation time $t_1$ is varied systematically, while the signals which have already been translated to the frequency domain related to the time axis $t_2$, are transformed a second time into frequency-dependent signals, related to the time axis $t_1$, a two-dimensional presentation is obtained of the secondary effects imaginable for the primary ions. If the parameters are conveniently selected, it is possible in this manner, in the presence of a collision gas, to generate for example spectra of the type which are comparable to the spectra obtained with the aid of MS/MS experiments. Useful experiments can be obtained also without application of the observation pulse $P_3$.

Transformation of the time-dependent rf signals into the frequency-dependent signals can be achieved in the case of the method of the invention also in the conventional manner, by two-dimensional Fourier transformation. Considering, however, that the destruction of the coherence by the second rf pulse $P_2$, in response to the preparation time $t_2$, does not necessarily follow the sine law, Fourier transformation will supply a spectrum, related to the preparation time $t_1$, which may also contain harmonics of the real lines. Such side bands may complicate the interpretation of two-dimensional ICR spectra. Consequently, it is provided according to a further improvement of the invention that the transformation of the time-dependent rf signals into the frequency-dependent signals is effected using the method of maximum entropy which has been described for example by P. J. Hore in J. Magn. Reson. 62 (1985) 561.

The present invention further relates to an ICR mass spectrometer adapted for carrying out the method according to the invention. Such an ICR mass spectrometer comprises a conventional measuring cell, transmitter means connected thereto for generating rf signals, receiver means, which are likewise connected thereto, for the induced rf signals and a computer connected to the receiver means for transforming the time-dependent rf signals received into corresponding frequency-dependent signals. In order to enable the method according to the invention to be carried out, the transmitter means is adapted for generating two rf pulses of equal frequency and a third rf pulse of equal or another, adjustable frequency. In addition, the transmitter means comprises at least one time element by means of which the interval between the first and the second rf pulses can be varied continuously. Another time element might serve for adjusting the interval between the second and the third rf pulses, which remains constant during one experiment, to a particular value suited for the particular type of experiment to be conducted. The receiver means is arranged for storing a plurality of time-dependent rf signals, it being necessary to store an induction signal for each value of the preparation time $t_1$ as varied during recording of the spectra. Finally, the computer for transforming the time-dependent rf signals is adapted for generating two-dimensional frequency-dependent signals from the sets of time-dependent rf signals stored, and in particular for performing rapid two-dimensional Fourier transformation. All components needed for building up an ICR mass spectrometer according to the invention are known as such and may be combined by the man of the art to suit the particular requirements. However, they were never used heretofore in this form for an ICR mass spectrometer. In this connection it is particularly desirable that the transmitter means for generating rf pulses should have a carrier frequency varying during the duration of the rf pulse, i.e. should be adapted for generating chirp pulses.

Figure 1B:
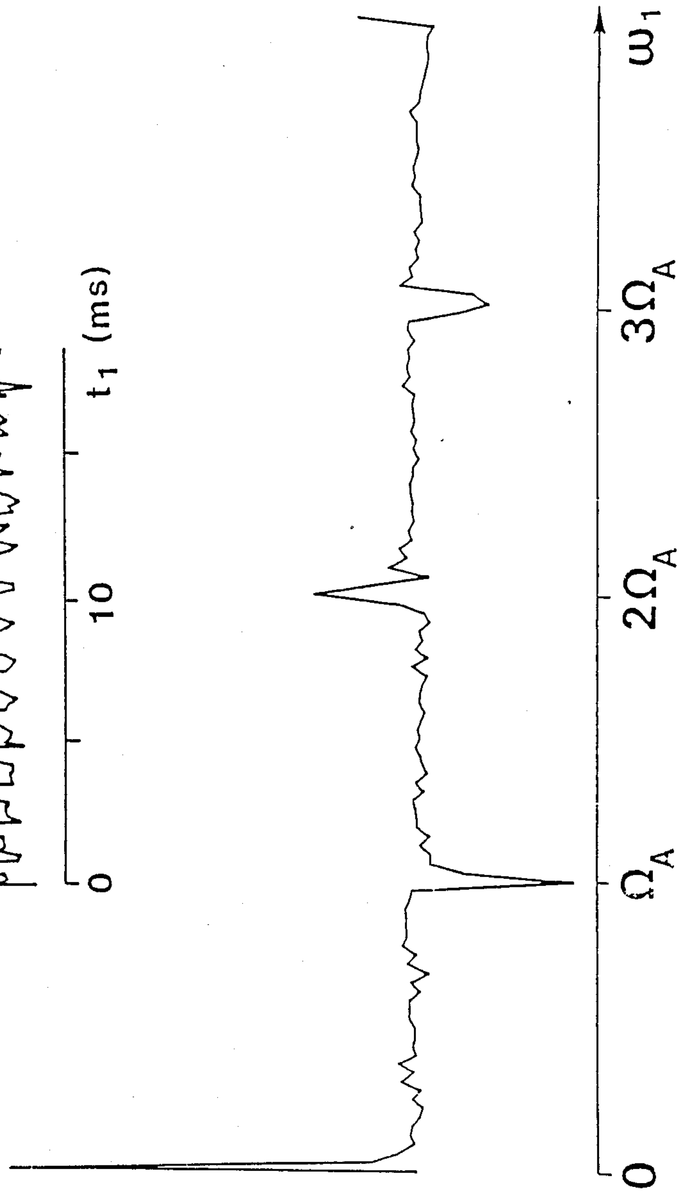

The invention will now be described in greater detail with reference to several embodiments of the method according to the invention and to the spectra obtained thereby which are represented in the drawing in which FIG. 1*a* shows the ICR signal S ($t_1$, $\omega_2$) of $^{81}$Br-Pyridin+, modulated as a function of the preparation time $t_1$, FIG. 1*b* shows the Fourier transform of the ICR signal according to FIG. 1*a;*

Figure 2:
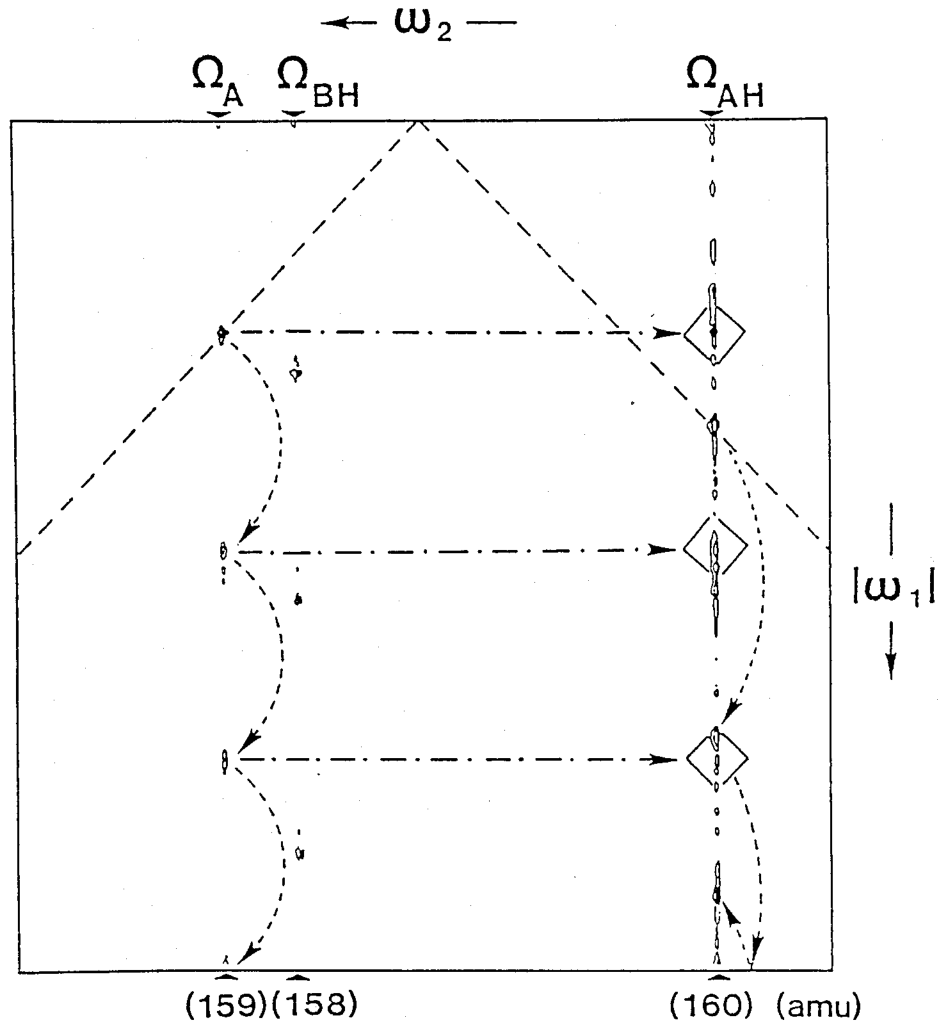
Figure 3:
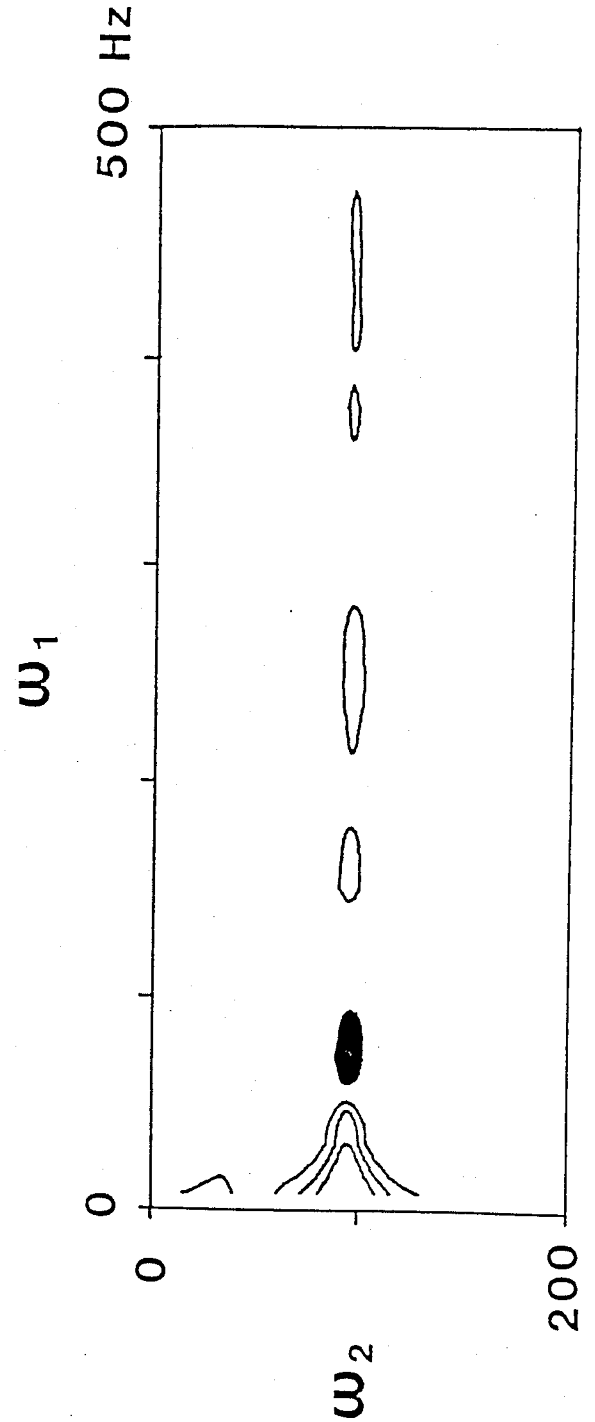

FIG. 2 shows a two-dimensional Fourier ICR spectrum of $^{81}$Br-Pyridin+; and FIG. 3 shows the two-dimensional ICR spectrum of the reaction of $CH_3CO^+ + CH_3COCH_3 \rightarrow CH_3C^+(OH)CH_3$.

The following experiments were carried out using a spectrospin ICR mass spectrometer model CMS-47, whose superconductive magent generates a field of 3T, and a computer model Aspect 3000.

To begin with, a mixture of $^{81}$Br-Pyridin and $^{79}$Br-Pyridin was investigated. The two substances will be described hereafter as substances A and B so that:

A=$^{81}$Br-Pyridin; $m_A$=159 amu, $f_A$=289.7 kHz; $f_{AH}$=287.8 kHz

B=$^{79}$Br-Pyridin; $m_B$=157 amu, $f_B$=293.4 kHz; $f_{BH}$=291.5 kHz

These substances may enter into the following reactions, to the extent these are interesting for the purposes of the present experiment, namely a hydrogen transfer from neutral particles to the ion:

$$A^{+\cdot} + A \text{ or } B \rightarrow AH^+ + \text{neutral products,}$$

and a proton transfer from the ion to neutral particles:

$$A^{+\cdot} \text{ or } B^{+\cdot} + A \rightarrow AH^+ + \text{neutral products.}$$

The Br-Pyridin was ionized at a pressure of $6.10^{-8}$ mbar by a 20 ms pulse of 70 eV electrons. The duration of the rf pulses was 20 $\mu$s and their amplitude 35 $V_{pp}$. The frequency $f_0$ of the rf pulses was spaced from the frequency $f_A$ of the $^{81}$Br-Pyridin by $\Omega_A/2\pi$=760 Hz.

The spectral window created in this manner was sufficiently large to record the signals of $A^{+\cdot}$ and $AH^{+}$, whereas the signals of $BH^{+}$ were convoluted. FIG. 1 demonstrates the dependence on $t_1$ of the signal of $A^{+\cdot}$ which is obtained by the measuring sequence $$P_1—t_1—P_2—T_m—P_3—t_2$$

explained above. The sharp peaks in the $t_1$ range appear when $$\Omega_A t_1=(2k+1)\phi,\ k=0, 1, 2 \ldots,$$

i.e. every time a phase shift $\Omega_A t_1$, relative to the rf oscillation of the pulse $P_1$, developing in the course of the preparation time $t_1$ reaches a value of 180°. Consequently, these peaks appear at time intervals of 1.32 ms. The digitalization interval used for plotting this curve was $\Delta t_1=166$ μs. Under these conditions, the second rf pulse $P_2$ has the effect, in the before-described sequence, of "de-energizing" the ions which had been originally excited by the first rf pulse $P_1$, so that they exhibit almost negligible kinetic energy during the reaction interval $T_m$ and can be returned to the cyclotron paths by the third rf pulse $P_3$, where they can then be observed. FIG. 1*b* finally shows the Fourier transform of the ICR signals according to FIG. 1*a*, where even-numbered and uneven-numbered side bands are represented with positive or negative amplitude, respectively.

FIG. 2 shows the complete two-dimensional spectrum. The $\omega_2$ frequency axis corresponds to the Fourier transform, related to the observation time $t_2$. The vertical $\omega_1$ range, which was obtained by real cosine transformation, related to the preparation time $t_1$, exhibits side-band families which are interconnected by curved lines for the sake of greater clarity. The cross-section, i.e. the column for $\omega_2=\Omega_A$ corresponds to the Fourier transform represented in FIG. 1*b*. The first side bands of all families lie on one of the diagonals represented by dashed lines in FIG. 2, except for the resonance at $\Omega_{BH}$ which is convoluted. The frequency source at the intersection of the dashed diagonal lines corresponds to the rf carrier frequency $f_0$. The column at $\omega_2=\Omega_{AH}$, contains not only a diagonal with its series of side bands, but also a cross-line at $\omega_1=\Omega_A$ and $\omega_2=\Omega_{AH}$ with the associated side bands which are all marked by rectangles. These signals furnish direct proof of the before-described reaction, namely $A^{+\cdot}\rightarrow AH^{+\cdot}$. Due to their alternating signs, these lines can be identified without any ambiguity. The spectral width was 3000 Hz in both ranges. The number of points observed was 240×2048 in both time ranges $t_1$ and $t_2$, which were filled up by zeros to 256×2048 points prior to Fourier transformation. The line expansion was 20 Hz in the $\omega_2$ range and 40 Hz in the $\omega_1$ range.

In spite of the unambiguity of the lines, it may be difficult to interpret such two-dimensional spectra due to the presence of both diagonal and cross-lines, with their associated side-band families. As mentioned before, it is however possible to avoid the appearance of side bands by using the method of maximum entropy instead of the Fourier transformation for transforming the time-dependent rf signals into frequency-dependent signals. This change does, however, not affect the measuring process as such so that it was regarded as unnecessary for the present purposes to describe an example of a spectrum obtained with the aid of the method of maximum entropy.

For the purpose of illustrating that variant of the method where a carrier frequency used for the third rf pulse $P_3$ is different from that used for the first two rf signals $P_1$ and $P_2$ the following reaction was selected:

$$CH_3CO^+ + CH_3COCH_3 \rightarrow CH_3C^+(OH)CH_3.$$

$CH_3CO^+$ has a mass ratio of $m_C=43$ amu and a resonance frequency of $f_C=1071$ kHz. The reaction product $CH_3C^+(OH)CH_3$ has the mass ratio of $m_D=59$ amu and a resonance frequency of $f_D=779{,}9$ kHz.

The carrier frequency selected for the first two rf pulses $P_1$ and $P_2$ was spaced from $f_C$ by 79 Hz, while the frequency selected for the third rf pulse $P_3$ was spaced from $f_D$ by 100 Hz. The two-dimensional ICR spectrum recorded in the described manner is represented in FIG. 3. The appearance of a cross-line in the $\omega_2$ range, which is represented vertically in this figure, at $\omega_2/2\pi=100$ Hz, and in the $\omega_1$ range at $\omega_1/2\pi=79$ Hz, indicates clearly that the before-described reaction has actually taken place. The cross-line is again accompanied in the horizontal $\omega_1$ range by a side-band family the members of which appear at multiples of 79 Hz. The spectral width of the complete matrix was 500×500 Hz, of which only 40% are shown in the drawing. The number of data points processed was 56×4048, filled up by zeros to 128×4048 data points. The line expansion was 30 Hz in the $\omega_1$ range and 20 Hz in the $\omega_2$ range.

Instead of using different frequencies for the first two rf pulses $P_1$, $P_2$ and third rf pulse $P_3$, adapted to the resonance frequencies of the starting products and the end products, it is also possible to use broad-band pulses in the form of so-called chirp pulses whose carrier frequency is varied over a range which comprises the resonance frequencies of the starting materials and the expected reaction products. The use of such broad-band pulses also does not in any way change the basic functional sequence of the method according to the invention.

As mentioned before, the method according to the invention furnishes substantially the same results which can be obtained by an MS/MS experiment. Still, the method according to the invention offers many advantages which will make themselves felt especially when complex networks are to be investigated where a plurality of exchange processes occur simultaneously and are all recorded at the same time by the method according to the invention, while in the case of an MS/MS experiment all exchange processes possible have to be recorded by individual measurements to be performed one after the other. The method according to the invention also permits to investigate the kinetics of reactions, by observing the amplitude of the signals obtained as a function of the duration of the reaction interval $T_m$, or else in response to different manipulations to which the system under investigation is exposed during the reaction time $T_m$, as for example laser pulses, electron-ray pulses or neutral gases which are introduced in the form of pulses and whose molecules give rise to collision reactions.

It is clear from the above that the novel method offers the man of the art a broad range of possibilities for carrying out mass-spectroscopic investigations which heretofore could be carried out, with the aid of the previously known methods, only with great difficulty or not at all.

We claim:

1. Method for recording ICR mass spectra wherein the ions of a substance to be examined, which are trapped in the measuring cell of an ICR mass spectrometer, are excited to coherent oscillation by means of an rf pulse applied to the measuring cell, whereafter the rf signals induced by the oscillations of the excited ions are received for a pre-determined measuring period, recorded and transformed into frequency-dependent signals, characterized by the steps of applying a first rf pulse $P_1$ for exciting the ions, irradiating upon the excited ions, after a pre-determined first period $t_1$, a second rf pulse $P_2$ containing the same frequency as the first rf pulse $P_1$, applying, after a pre-determined mixing period $T_m$ following the second rf pulse $P_2$, a third rf pulse $P_3$ which again effects coherent excitation of the ions contained in the measuring cell, receiving and recording during the pre-determined measuring period $t_2$ the rf signals induced by the oscillations excited by the third rf pulse $P_3$, repeating several times the measuring sequence described before and comprising the steps of exciting the ions by means of three rf pulses $P_1$, $P_2$, $P_3$ following each other in time and recording the induced time-dependent rf signal, while varying the pre-determined period $t_1$, and transforming finally the sets of rf signals dependent on the measuring time $t_2$, which are now dependent on the variation of the period $t_1$, into two-dimensional frequency-dependent signals, by eliminating the dependence on $t_2$ and $t_1$.

2. Method according to claim 1, characterized in that the third rf pulse $P_3$ has a carrier frequency different from that of the first two rf pulses $P_1$ and $P_2$.

3. Method according to claim 1, characterized in that the rf pulses are broad-band pulses having a carrier frequency varying within a pre-determined range (chirp pulses).

4. Method according to claim 1, characterized in that transformation of the time-dependent rf signals into the frequency-dependent signals is effected by two-dimensional Fourier transformation.

5. Method according to claim 1, characterized in that transformation of the time-dependent rf signals into the frequency-dependent signals is effected according to the method of maximum entropy.

6. ICR mass spectrometer comprising a conventional measuring cell, transmitter means connected thereto for generating rf signals, receiver means, which are likewise connected thereto, for the induced rf signals and a computer connected to the receiver means for transforming the time-dependent rf signals received into corresponding frequency-dependent signals, characterized in that the transmitter means is generating two rf pulses of equal frequency and a third rf pulse of equal or another, adjustable frequency and comprises at least one time element by means of which the interval between the first and the second rf pulses can be varied continuously, that the receiver means is arranged for storing a plurality of time-dependent rf signals, and that the computer for transforming the time-dependent rf signals is generating two-dimensional frequency-dependent signals from the sets of time-dependent rf signals stored.

7. ICR mass spectrometer according to claim 6, characterized in that the transmitter means is generating rf pulses with a carrier frequency varying during the duration of the rf pulse.

* * * * *